United States Patent
Scherling

(10) Patent No.: US 8,139,125 B2
(45) Date of Patent: Mar. 20, 2012

(54) OPTICAL IMAGE RECORDING DEVICE WITH SMALL HEIGHT AND HIGH RESOLUTION

(75) Inventor: Herman Scherling, Kopenhagen (DK)

(73) Assignee: Nokia Corporation, Espoo (FI)

( * ) Notice: Subject to any disclaimer, the term of this patent is extended or adjusted under 35 U.S.C. 154(b) by 567 days.

(21) Appl. No.: 12/227,086

(22) PCT Filed: May 5, 2006

(86) PCT No.: PCT/IB2006/051423
§ 371 (c)(1),
(2), (4) Date: Nov. 5, 2008

(87) PCT Pub. No.: WO2007/129147
PCT Pub. Date: Nov. 15, 2007

(65) Prior Publication Data
US 2009/0102948 A1   Apr. 23, 2009

(51) Int. Cl.
*H04N 5/76* (2006.01)
*H04N 5/225* (2006.01)
(52) U.S. Cl. .................... 348/231.99; 348/335
(58) Field of Classification Search ............ 348/231.99, 348/335, 340, 373–376
See application file for complete search history.

(56) References Cited

U.S. PATENT DOCUMENTS

| | | | |
|---|---|---|---|
| 5,194,959 A | 3/1993 | Kaneko et al. | |
| 5,907,434 A * | 5/1999 | Sekine et al. | 359/462 |
| 5,940,126 A * | 8/1999 | Kimura | 348/294 |
| 6,011,876 A | 1/2000 | Kishner | |
| 6,850,279 B1 | 2/2005 | Scherling | |
| 7,382,410 B2 * | 6/2008 | Togino | 348/333.07 |
| 7,453,517 B2 * | 11/2008 | Fujimoto et al. | 348/374 |
| 2005/0111106 A1 | 5/2005 | Matsumoto et al. | |
| 2005/0140792 A1 * | 6/2005 | Hermsen | 348/208.12 |
| 2007/0019099 A1 * | 1/2007 | Lieberman et al. | 348/335 |
| 2008/0019684 A1 * | 1/2008 | Shyu et al. | 396/332 |

FOREIGN PATENT DOCUMENTS

| | | |
|---|---|---|
| CN | 1532622 | 9/2004 |
| CN | 1618231 | 5/2005 |
| DE | 10201877 | 4/2003 |
| JP | 8334667 | 12/1996 |
| JP | 2000208826 | 7/2000 |
| JP | 2003207836 | 7/2003 |
| JP | 2004325471 | 11/2004 |
| JP | 2006091210 | 4/2006 |

\* cited by examiner

*Primary Examiner* — Trung Diep
(74) *Attorney, Agent, or Firm* — Alfred A. Fressola; Ware, Fressola, Van Der Sluys & Adolphson LLP

(57) ABSTRACT

An optical image recording device comprises a housing having a comparatively small height and at least one comparatively broad optical image information entering surface, an optical path unit including a first lens array, a second lens array and an optical image recording device including an image sensor, while in the optical path unit the first lens array is guiding the entering optical information to the optical axis of the second lens array extending substantially perpendicular to the height of the housing and the optical image information is received by the image sensor, and the optical image recording device further including electrical circuitry coupled to the image sensor for processing and storing the image data.

19 Claims, 4 Drawing Sheets

OPTICAL IMAGE RECORDING DEVICE WITH SMALL HEIGHT AND HIGH RESOLUTION

CROSS REFERENCE TO RELATED APPLICATIONS

This application is the U.S. National Stage of International Application Number PCT/IB2006/051423 filed on May 5, 2006 which was published in English on Nov. 15, 2007 under International Publication Number WO 2007/129147.

TECHNICAL FIELD

The present invention relates to an optical image recording device comprising a housing having a comparatively small height and at least one comparatively broad optical image information entering surface, an optical path unit including a first lens array, a second lens array and an optical image recording device including an image sensor, while in the optical path unit the first lens array is guiding the entering optical information to the optical axis of the second lens array extending substantially perpendicular to the height of the housing and the optical image information is received by the image sensor, and the optical image recording device is further including electrical circuitry (means) coupled to the image sensor for processing and storing the image data.

BACKGROUND OF THE INVENTION

U.S. Pat. No. 6,850,279 B1 discloses an optical image recording device according to the preamble.

The optical image recording device according to the prior art comprises a camera housing with "comparatively" broad surfaces and a "comparatively" small height, while "comparatively" means that cameras of that kind have a flat configuration compared with conventional size cameras. In this type of camera according to the prior art mentioned above, the lens system is completely accommodated within the housing such that the optical image recording system at all times has a low height and a robust structure. Thus, this type of camera can easily be kept in a wallet or a small handbag designed for carrying credit cards. Such a camera has, compared to other prior art cameras, e.g. card type cameras, the advantage that the lens system does not have to be removed from the housing before being inserted in such a wallet or handbag.

In the device according to the prior art the optical information is received through the front lens array having the optical axis extending perpendicular to one of the broad surfaces of the housing. The entering optical information is then reflected by a reflective element, e.g. a mirror, in an angle of e.g. 90° into the optical axis of the second lens array extending in a direction perpendicular to the height of the housing, e.g. extending along the length of the housing, which preferably is its largest dimension. The optical information processed by the second lens array is received by an image recording device, including a CCD (charge coupled device) or CMOS (complementary metal oxide semiconductor) image sensor with a two-dimensional light-sensitive array. The optical image is transformed into electrical signals and stored as e.g. RAW image information. The electrical signals can be processed and stored in a data processing device, typically a microcomputer.

US 2005/0111106 A1 discloses an optical element assembly in which incident light arriving from an object and input to a second optical element is reflected by using a prism.

SUMMARY OF THE INVENTION

It is the object of the present invention to improve the optical image recording device as mentioned in the preamble in such a way that it is optimised with respect to both, its mechanical construction and optical resolution.

This object is achieved by the features that at least two different optical path units are comprised, each of which is processing and recording at least a respective part of the entering optical information, and that a combiner (combining means) are provided in the optical image recording device for electrically combining the signals recorded in the respective optical image recording devices.

It is an advantage of the present invention that because of the using of different parallel optical path units the mechanical dimensions of each unit may be optimised and the information processed by each of the optical path units can be combined at the electronic level, respectively. This may lead to either an optical image recording device with an improved resolution for a given height or, alternatively, to an optical device with a further reduced height relative to a given resolution.

In an embodiment of the present invention, each of the optical path units comprise a two-dimensional image sensor one dimension of which is extending along the height of the housing. Thus, the optical axis of the second lens array already coincides with the optical axis of the image sensor with the consequence that no further optical or mechanical equipment is needed. This embodiment allows for each of the optical path units to use image sensors with a reduced height, respectively, while the total optical image information may be combined from the electronic signals output from each of the image sensors. In another embodiment, wherein a pair of optical path units is comprised, each of the two image sensors may have only about half of its lateral dimension compared to a "one optical path unit" device according to the prior art. As the dimension of the image sensor is one of the important factors for determining the size of the camera, a reduction of the height is achieved.

A further embodiment is characterised in that at least a pair of optical path units being arranged anti-parallel to each other is comprised, each of which optical path unit is processing its respective image entering along its respective viewing cone allocated to the corresponding first lens array and that the combining means are provided to composite the complete image information. Thus, the resolution of each of the optical path units is maintained and the height mainly determined by the size of the image sensor may be minimized. If according to a preferred detail of this embodiment, the viewing cones of the pair of optical path units are partially overlapping, this allows for recovering of information which might be lost at the sides of the viewing cones.

A further alternative for an embodiment of the invention is characterised in that an aperture is comprised between the first and the second lens array, which aperture advantageously is a mechanical shutter.

A further embodiment is characterised in that an autofocus unit is comprised in each optical path unit.

As one alternative solution the autofocus unit comprises a manipulating means for moving the image sensor in a direction perpendicular to the height of the housing, while the manipulating means for moving the image sensor preferably includes a piezoelectric actuator element. The piezoelectric actuator element may be engaged with a mass block in order to improve the mechanical performance, if the image sensor in itself does not have a sufficient inertia.

As another alternative solution the autofocus unit provided in each optical path unit comprises a further manipulating means for moving the second lens array or part thereof relative to the first lens array inside the housing, while keeping the image sensor fixed.

Generally, in all of the embodiments of the present invention the first lens array comprises or consists of a prism.

In still another embodiment of the invention the image sensor is a planar sensor, particularly a CCD or CMOS sensor, comprising its electrical connections at the side extending along the (size determining) height of the housing. Thus, the optically active area of the image sensor is effectively used along the entire height of the housing and the electrical connections are at the side of the image sensor which is not size determining.

The invention may be used as a very flat optical camera module with optical zoom and a wide angle. A typical use of this type of camera is in combination with a mobile phone. Because the camera module becomes very thin, it can be placed next to e.g. the battery, the engine, the loudspeaker or the vibrator of the mobile phone without increasing the thickness of the phone.

A further embodiment for the optical zoom involves that the reflective surface of the first lens array can adjust its angle corresponding to the viewing angle in order to avoid too much overlap between the viewing cones and maintain the aspect ratio.

These and other aspects of the invention will be apparent from and elucidated with reference to the embodiment described hereafter.

BRIEF DESCRIPTION OF THE DRAWINGS

In the Figures show

DETAILED DESCRIPTION

Figure 1:
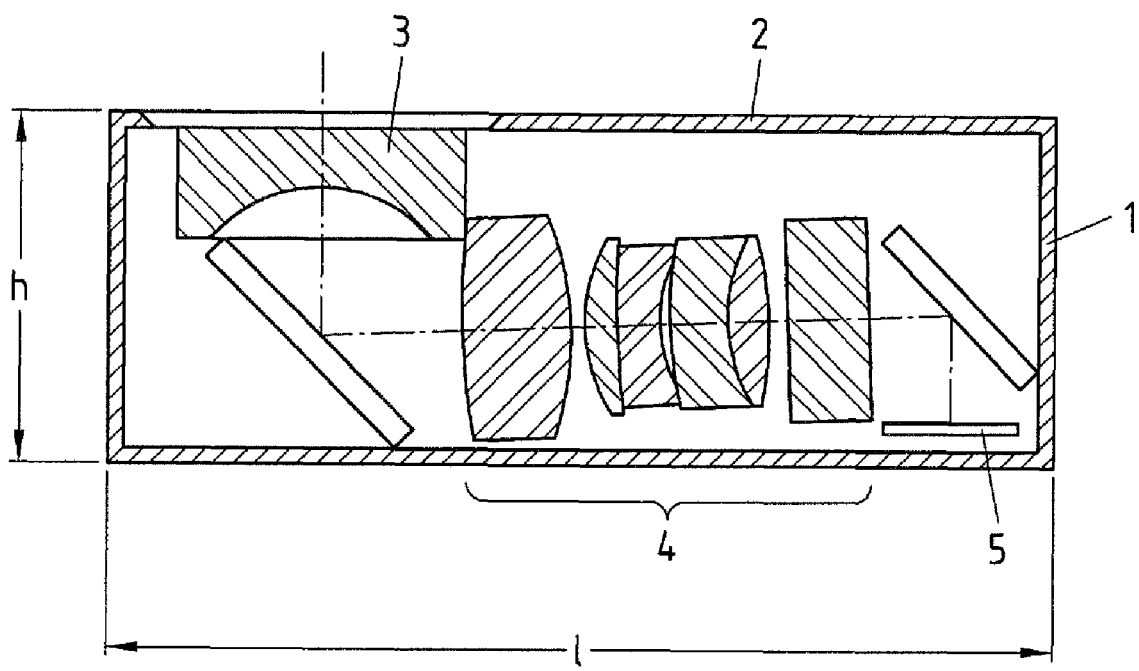
FIG. 1 a cross-sectional view of an optical image recording device according to the prior art.

FIG. 1 shows the cross-sectional view of the principle of the set-up of an optical image recording device according to the prior art. The optical image recording device comprises a housing 1 inside of which all components furthermore described are included.

The housing 1 has a three-dimensional shape with a relatively small height h, a length l and a width w (not to be seen). The housing 1 comprises two relatively broad surfaces extending along the length 1 of the housing 1. One of the broad surfaces, upper surface 2, comprises an opening through which the optical information is received along the optical axis (vertical dashed line) extending perpendicular to the surface 2. The entering optical information is reflected by a mirror in an angle of about 90° into the optical axis (horizontal dashed line) of a second lens array 4. The second lens array 4 is extending along the length l of the housing 1. After passing the second lens array 4, the optical information is again reflected by a further reflecting element after which it is received by a planar image sensor 5 which includes a light sensitive charge coupled device (CCD). Accordingly, the optical information is received by the image sensor 5 and transformed into electrical signals. The electrical signals can be further processed, e.g. compressed, and stored in a semiconductor memory.

Figure 2:
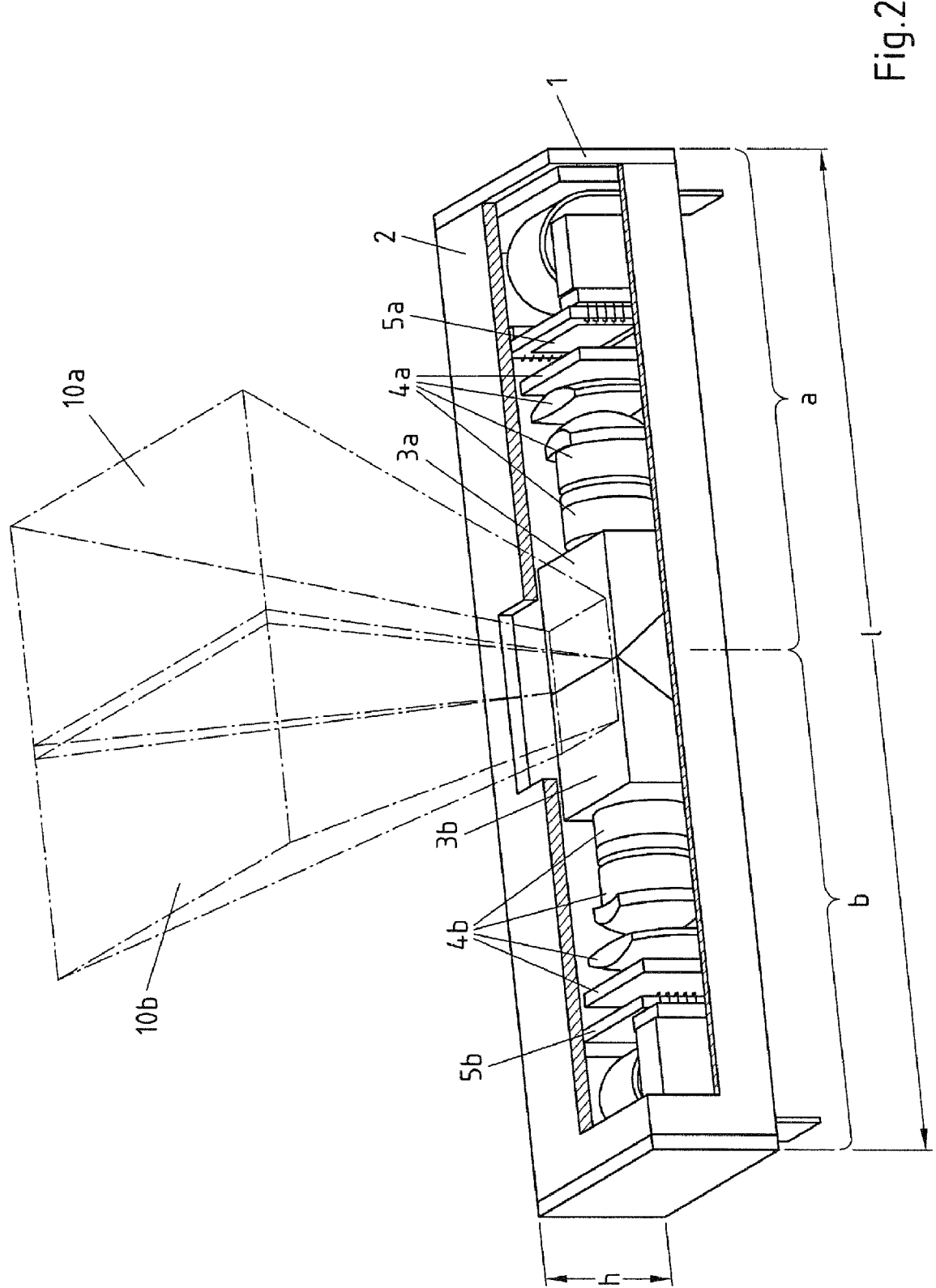
FIG. 2 a cross-sectional view of an optical image recording device according to an embodiment of the present invention.

FIG. 2 shows a sectional view of the embodiment of the present invention.

Basically, the embodiment according to the present invention includes a housing 1 similar to that of FIG. 1, but in which two different, independently operating optical path units, generally designated as a, b are comprised. As can be taken from FIG. 2, both optical path units a, b have basically the same set-up but are arranged in a manner anti-parallel to each other inside the housing 1.

A common opening on the broad surface 2 of the housing 1 is provided through which the object image may be viewed along two different viewing cones 10a, 10b, each of the viewing cones emanating from its allocated prism or reflective elements 3a, 3b. Each prism 3a, 3b is arranged adjacent to the opening in the surface 2 of the housing 1. The information corresponding to the viewing cone 10a emanating from the prism 3a is further processed by the optical and electrical elements shown in the right part (designated as a) of FIG. 2, while the information from the viewing cone 10b received by the prism 3b is further processed by the components shown in the left-hand side (designated as b) of the housing 1.

The optical axis of the respective image incoming through the viewing cones 10a, 10b is "folded" by the prisms 3a, 3b, respectively, so that the optical axis is becoming horizontally and is leading into the respective second lens array 4a on the right-hand side or 4b on the left-hand side.

Each of the optical units work the same way, as basically described with respect to the prior art device in FIG. 1.

The information received from each of the image sensors 5a, 5b is further processed in a common electrical processor which operates in a way that the information separately received from the two optical path units is combined in a suitable way to composite the total optical information as desired. As this combination operation is done on an electrical level, no significant space is required. Because of the two independent optical systems, the lateral dimension of the optically active part of each of the image sensors 5a, 5b in direction of the height h of housing 1 may be reduced to close to its half, though still catching the complete optical information. Only the optically active part can be reduced, and as overlapping is needed, it cannot be reduced to its half, but very close to.

As practical examples for implementing the present invention, the following dimensions (height of the device) and resolutions (pixels) are practically available for an optical image recording device:

| Pixels | Height |
|---|---|
| 2 M | 4.0 mm |
| 3 M | 4.4 mm |
| 5 M | 4.9 mm |
| 8 M | 5.3 mm |

Compared to alternative solutions known from the prior art, the height of the camera of the present invention is thus significantly reduced relative to a given resolution of the image sensor.

FIG. 3 shows a sectional view through a detail referring to the optical path unit b of FIG. 2. While the first optical lens through which the optical information is entering, is a single prism 3b, the second lens array comprises a variety of conventional optical lenses 4b, one of which could be a filter lens 11b. Between the prism 3b and the first lens of the second lens array 4b an aperture, which advantageously is a mechanical shutter, is placed (not shown in the drawings).

Figure 3A:
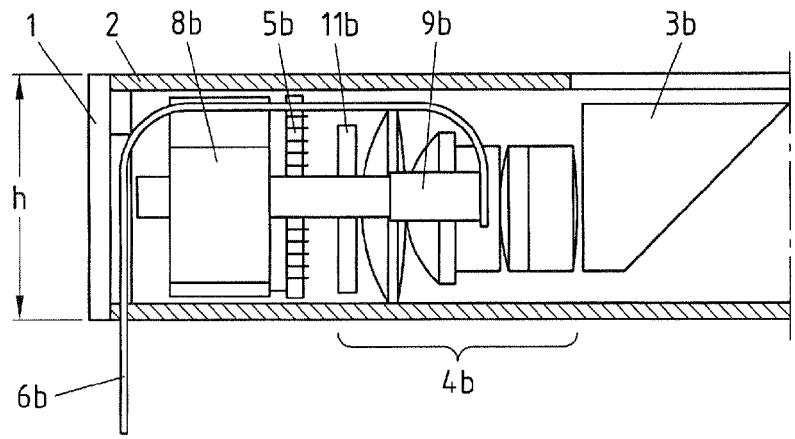
FIG. 3a a cross-sectional view showing a detail of FIG. 2.
Figure 3B:
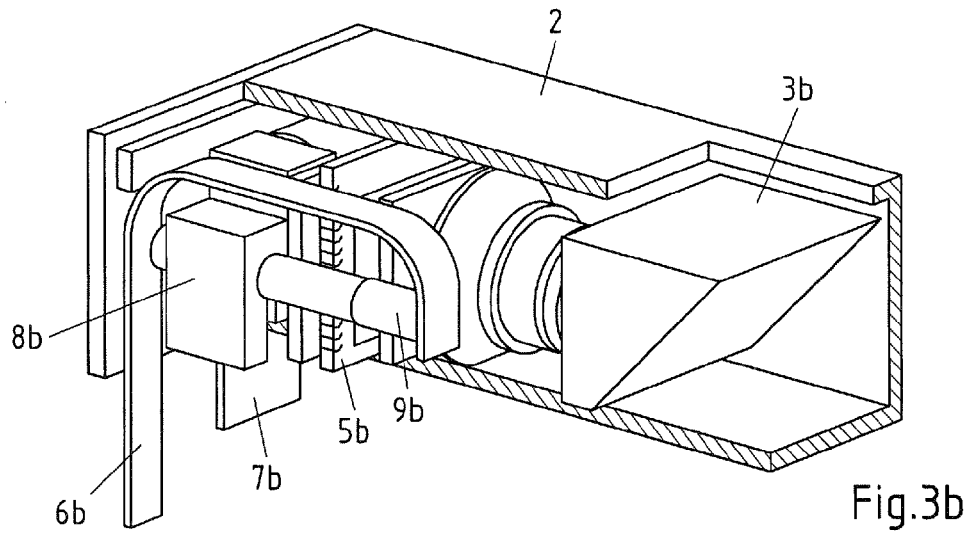
FIG. 3b a perspective view of the detail of FIG. 2 seen from above.
Figure 3C:
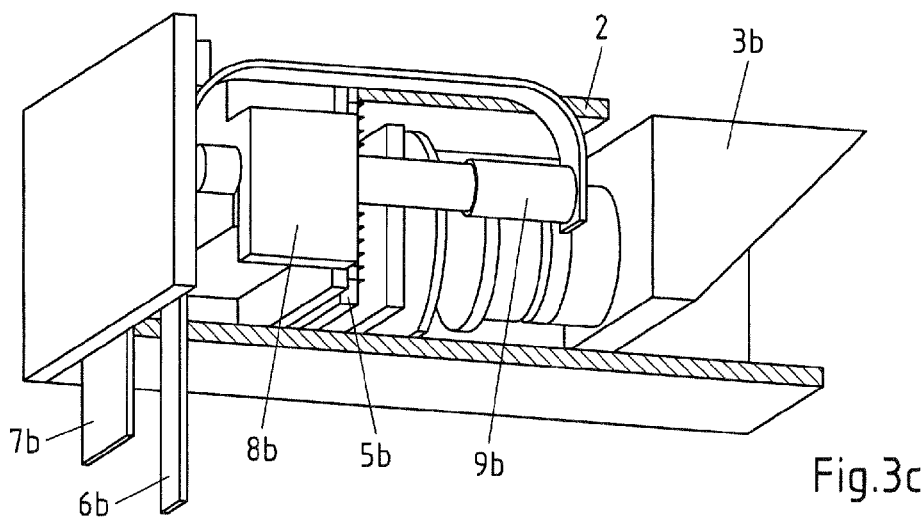
FIG. 3c a perspective view of the detail of FIG. 2 seen from downside.

It should be noted that FIGS. 3a to 3c only show a detail ("part b") of the image sensor system according to the present invention as depicted in FIG. 2. In the complete system of FIG. 2, both prisms 3a, 3b must be as close together as possible. They should work as one prism that is "folded" on the middle to project half of the image into the second half of the second lens array. There typically will be two prisms, but there can also be realized as one prism unit with the prisms 3a, 3b being mechanically attached to each other.

An additional feature which is now described with respect to the drawings of FIGS. 3a, 3b, 3c is the autofocus function of the optical image recording device.

For accomplishing the autofocus function, the image sensor 5b as such is arranged to be moved in the longitudinal direction of the optical system as shown in FIG. 3b which corresponds to the dimension l of the housing 1 (FIG. 2). For this, a manipulating means is placed behind or at the side of the image sensor 5b. The manipulating means includes a mass block 8b of given size and weight cooperating with a piezoelectric element 9b as an actuator for the movement. As can be seen from FIG. 3b, the piezoelectric element 9b is attached to a flexible connection 6b leading outside the housing 1. Thus, by activating the actuator, the image sensor 5b is driven by the piezoelectric element 9b in horizontal direction.

As an alternative to the above (not depicted in the drawings), the autofocus function may be also accomplished by moving the second lens array 4b or part thereof in the direction of the length l of the housing 1 with respect to the prism 3b and the image sensor 5b as fixed elements, respectively.

Figure 4:
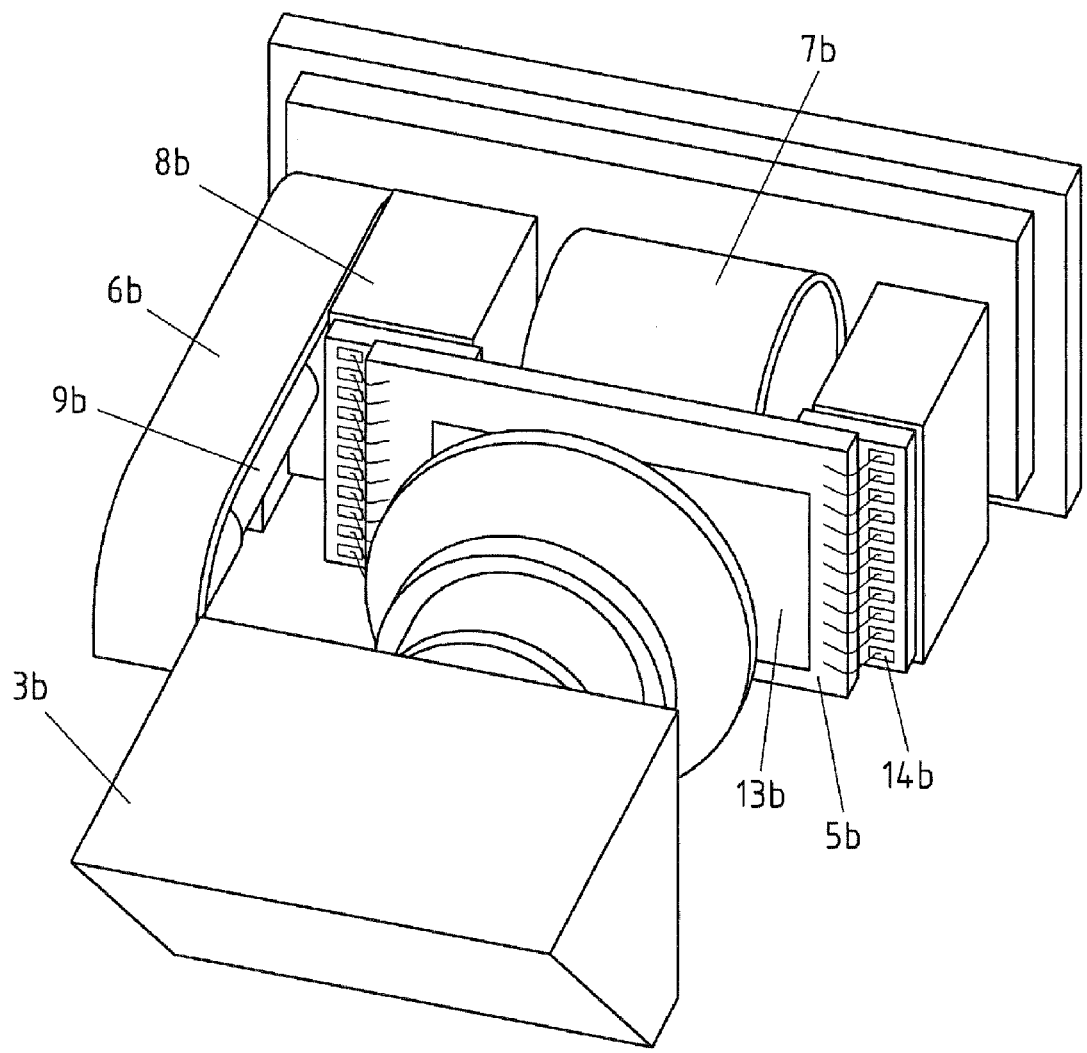
FIG. 4 a perspective view of a detail of FIG. 3b.

FIG. 4 shows a detail of the embodiment shown in FIG. 3b. The detailed drawing shows the planar image sensor 5b, the active area of which is designed with numeral 13b. The image sensor 5b is fixed inside of the housing on a printed wiring board (PWB) or on other substrate 14b which is flexibly connected by a connection means 7b. The active area 13b of the image sensor 5b is optimised in a way that it is extending as far as possible in the dimension extending along the height h of the housing 1. To achieve this, any electrical connections 14b are placed at the non-size determining sides of the image sensor.

The invention claimed is:

1. An optical image recording device comprising
a housing having a comparatively small height and at least one comparatively broad optical image information entering surface,
an optical path unit including a light guiding element, an image forming lens array and an optical image recording device including an image sensor, while in the optical path unit the light guiding element is guiding the entering optical information to the optical axis of the image forming lens array extending substantially perpendicular to the height of the housing and the optical image information is received by the image sensor through the image forming lens array, and
the optical image recording device further including electrical means coupled to the image sensor for processing and storing the image data,
characterised in that at least two different optical path units are comprised, each of which is processing and recording at least a respective part of the entering optical information, and that combining means are provided in the optical image recording device for electrically combining the signals recorded in the respective optical image recording devices;
wherein said at least two different optical path units comprise a first optical path unit and a second optical path unit, wherein
the first optical path unit comprises a first image sensor, a first image forming lens array and a first light guiding element for guiding the perspective part of the entering optical information through the first image forming lens array to the first image sensor;
the second optical path unit comprises a second image sensor, a second image forming lens array and a second light guiding element for guiding the perspective part of the entering optical information through the second image forming lens array to the second image sensor, wherein
the first image forming lens array has an optical axis substantially perpendicular to the height to the housing and
the second image forming lens array has an optical axis substantially perpendicular to the height to the housing, and wherein the first optical path unit and the second optical path unit are arranged such that the first image forming lens array and the second image forming lens array are located between the first image sensor and the second image sensor.

2. The optical image recording device according to claim 1, characterised in that each of the optical path units comprises a two-dimensional image sensor one dimension of which is extending along the height of the housing.

3. The optical image recording device according to claim 1, characterised in that at least a pair of optical path units being arranged anti-parallel to each other is comprised, each of which optical path unit is processing its respective image entering along respective viewing cones allocated to the corresponding light guiding element and that the combining means are provided to composite the complete image information.

4. The optical image recording device according to claim 3, characterised in that the viewing cones of the pair of optical path units are partially overlapping.

5. The optical image recording device according to claim 1, characterised in that an aperture is comprised between the light guiding element and the image forming lens array.

6. The optical image recording device according to claim 5, characterised in that the aperture is a mechanical shutter.

7. The optical image recording device according to claim 1, characterised in that an autofocus unit is comprised in each optical path unit.

8. The optical recording device according to claim 7, characterised in that the autofocus unit comprises a manipulating means for moving the image sensor in a direction perpendicular to the height of the housing.

9. The optical image recording device according to claim 8, characterised in that the manipulating means for moving the image sensor include an piezoelectric actuator element.

10. The optical image recording device according to claim 9, characterised in that the piezoelectric actuator element is engaged with a mass block.

11. The optical image recording device according to claim 7, characterised in that the autofocus unit comprised in each optical path unit comprises a further manipulating means for moving the image forming lens array or part thereof relative to the light guiding element inside the housing.

12. The optical recording device according to claim 1, characterised in that the light guiding element is a prism.

13. The optical image recording device according to claim 12, characterised in that in a pair of optical path units being arranged anti-parallel to each other two different prisms are comprised.

14. The optical image recording device according to claim 13, characterised in that the two prisms are mechanically attached as one prism unit.

15. The optical image recording device according to claim 1, characterised in that the image forming lens array includes conventional optical lenses.

16. The optical image recording device according to claim 1, characterised in that the image sensor is a planar sensor, particularly a CCD or CMOS sensor, comprising its electrical connections at the side extending along the height of the housing.

17. The optical image recording device according to claim 1, characterised in that it is part of a mobile phone capable of photography.

18. Combining means to be used in an optical recording device according to claim 1, the combining means being provided to composite the complete image information from the electrical signals recorded in the respective optical image recording device.

19. A non-transitory computer readable medium stored with software program code which is configured to realize composition of complete image information from electrical signals recorded in the respective optical image recording devices according to claim 1, when being executed by a processing unit.

* * * * *